United States Patent [19]

Bland et al.

[11] Patent Number: 5,129,090

[45] Date of Patent: Jul. 7, 1992

[54] SYSTEM BUS PREEMPT FOR 80386 WHEN RUNNING IN AN 80386/82385 MICROCOMPUTER SYSTEM WITH ARBITRATION

[75] Inventors: Patrick M. Bland; Mark E. Dean; Philip E. Milling, all of Delray Beach, Fla.

[73] Assignee: IBM Corporation, Armonk, N.Y.

[21] Appl. No.: 198,895

[22] Filed: May 26, 1988

[51] Int. Cl.⁵ .............................................. G06F 13/36
[52] U.S. Cl. .............................. 395/725; 364/DIG. 1; 364/242.92; 364/242.6
[58] Field of Search ............................. 364/200, 900

[56] References Cited

U.S. PATENT DOCUMENTS

| | | | |
|---|---|---|---|
| 4,402,040 | 8/1983 | Evett | 364/200 |
| 4,414,624 | 11/1983 | Summer et al. | 364/200 |
| 4,451,883 | 5/1984 | Stanley et al. | 364/200 |
| 4,481,580 | 11/1984 | Martin et al. | 364/200 |
| 4,578,782 | 3/1986 | Kraft et al. | 364/900 |
| 4,631,660 | 12/1986 | Woffinden et al. | 364/200 |
| 4,701,844 | 10/1987 | Thompson et al. | 364/200 |
| 4,742,454 | 5/1988 | Robinson et al. | 364/200 |
| 4,794,523 | 12/1988 | Adan et al. | 364/200 |
| 4,811,215 | 3/1989 | Smith | 364/200 |
| 4,949,301 | 8/1990 | Joshi et al. | 364/900 |

FOREIGN PATENT DOCUMENTS 0066766 12/1982 European Pat. Off. .
0192366 8/1986 European Pat. Off. .

OTHER PUBLICATIONS

W. Mayberry et al., Cache boosts multiprocessor performance, Nov. 1984, Computer Design, vol. 23, No. 13, pp. 133-138.
M. Baron, Stopping system memory and bus from putting the squeeze on fast CPU's, Electronics International, vol. 56, No. 19, Sep. 1983, pp. 155-158.
I. Wilson, Extending 80386 Performance, New Electronics, vol. 20, No. 7, Mar. 31, 1987, pp. 30-33.
Intel Corporation, "Introduction to the 80386 including the 80386 Data Sheet", Apr. 1986.
Intel Corporation, "82385 High Performance 32-Bit Cache Controller", Jul. 1987.
Intel Corporation, "80386 Hardware Reference Manual", Chapter 7, Cache Subsystems, 1986.
Alpers, "High Speed Bus Arbiter for Bus-Oriented Multiprocessor Systems", IBM TDB, vol. 28, No. 2, Jul. 1985, pp. 567-569.

Primary Examiner—Gareth D. Shaw
Assistant Examiner—Maria N. Von Buhr
Attorney, Agent, or Firm—John C. Black

[57] ABSTRACT

A multi-bus microcomputer system includes a cache subsystem and an arbitration supervisor. A CPU is provided with a PREEMPT signal source which generates a preempt signal in CPU cycles extending beyond a specified duration. The preempt signal is effective at any device having access to the bus to initiate an orderly termination of the bus usage. When that device signals its termination of bus usage, the arbitration supervisor changes the state of an ARB/GRANT conductor, which had been in the grant phase, to the arbitration phase. During the arbitration phase each of the devices (other than the CPU) cooperates in an arbitration mechanism for bus usage during the next grant phase. On the other hand, the CPU, having asserted preempt, responds to a signal indicating initiation of the arbitration phase by immediately accessing the system bus.

5 Claims, 9 Drawing Sheets

SYSTEM BUS PREEMPT FOR 80386 WHEN RUNNING IN AN 80386/82385 MICROCOMPUTER SYSTEM WITH ARBITRATION

FIELD OF THE INVENTION

The invention relates to providing an 80386 with an entry into bus arbitration in an 80386/82385 microcomputer system wherein the 82385 operates in master mode.

RELATED APPLICATIONS

The present invention is related to Application Ser. No. 030,786, entitled "Computer System Having Programmable DMA Control", filed Mar. 27, 1987, now Pat. No. 4,901,234, issued Feb. 13, 1990; Application Ser. No. 780,558, filed Oct. 16, 1991, which is a continuation of Application Ser. No. 030,788, entitled "DMA Access Arbitration Device in which CPU can Arbitrate on behalf of Attachment having no Arbiter", filed Mar. 27, 1987, now abandoned; and Application Serial No 725,223, filed June 26, 1991, which is a continuation of Application Ser. No. 102,690, entitled "Computer System having Dynamically Programmable Linear/Fairness Priority Arbitration Scheme" filed Sept. 30, 1987, now abandoned.

BACKGROUND ART

Background information respecting the 80386, its characteristics and its use in microcomputer systems including cache memory subsystems are described in Intel's "Introduction to the 80386", April 1986 and the 80386 Hardware Reference Manual (1986). The characteristics and operating performance of the 82385 are described in the Intel publication "82385 High Performance 32-Bit Cache Controller" (1987).

Devices for distributing a resource among a plurality of potential users are described in the above-identified applications, the disclosures of which are incorporated herein by reference. These applications describe distribution of a resource such as a computer bus subsystem and/or access to memory, among a plurality of devices on a single bus microcomputer system. Distribution of such a resource is commonly referred to as arbitration. The arbitration arrangements described in the above-referenced applications use distributed arbitration with a central supervisor to allocate the common resource to one of a plurality of potential users. However, the supervisor is controlled by the CPU so that, in the event the CPU requires access, it can control the supervisor in order to ensure that the CPU itself receives access to the common resource as required.

Microcomputer systems including a cache subsystem are, architecturally, significantly different from microcomputer systems without cache subsystems. Microcomputer systems with a cache subsystem operate as dual bus devices. More particularly, in microcomputer systems with a cache subsystem, there is a first bus (referred to as the CPU local bus) which interconnects the CPU, cache memory and cache control. Other devices are coupled to a different bus (system bus). Such other devices include for example main memory, I/O devices and ancillary apparatus. In addition to the foregoing devices, the system bus may also be coupled to the cache control.

The cache subsystem typically relieves the system bus from a large proportion of memory accesses that would otherwise be carried by the system bus in the absence of the cache subsystem. That is, to the extent that the CPU can obtain information from the cache memory, then for that particular cycle the CPU does not require access to the system bus. Accordingly, other devices can, during the same period of time, use the system bus for other operations. This is expected to result in a significant reduction of the system bus cycles which are actually used by the CPU. Usually the cache control is coupled to both the system bus and the CPU local bus, and one of the functions of the cache control is to supervise the arbitration supervisor which, in the single bus systems, had been supervised by the CPU.

One available cache controller, the 82385, has the capability of operating in a master or a slave mode. When the 82385 is operated in the master mode, and supervises the arbitration supervisor, there is no longer any mechanism for the CPU to contend for the system bus resource.

Accordingly, it is an object of this invention to provide a mechanism whereby a CPU, in a multi-bus microcomputer system with a cache control element supervising the arbitration supervisor, may access the system bus resource distributed by the arbitration mechanism.

The arbitration supervisor as described in the above-referenced applications, responds to arbitration request signals which are coupled in common from a plurality of devices. When the arbitration supervisor recognizes that one or more devices has requested the common resource, it signals the beginning of an arbitration period by changing the condition of a conductor (the ARB/$\overline{\text{GRANT}}$ is accessible to all the contending devices). When the contending devices see the condition of this conductor changed so as to signal the beginning of an arbitration period, the devices generate signals corresponding to their priority levels and drive a plurality of arbitration conductors dedicated to this function with those signals. The connection between the plurality of devices and the arbitration conductors are arranged such that the conductors assume that priority value of the highest priority circuit driving the arbitration conductors. Each device can therefore recognize, by comparing the priority value on the arbitration conductors with its own priority value, whether there is any higher priority device contending for access to the bus. At the termination of a predetermined arbitration period, the ARB/$\overline{\text{GRANT}}$ conductor changes state. This begins the grant period, during which that contending device whose priority value was the priority value on the arbitration conductors assumes control of the common resource to initiate a bus cycle.

Furthermore, as described in the above-referenced applications, there is still another conductor dedicated to a PREEMPT signal which can be generated to force a device having received access to the system resource, to terminate its access. Thus, a device which has received access to the system resource and is using that resource, on recognizing an asserted preempt, is required to initiate an orderly termination of its use of the system resource. When the device which is thus preempted terminates its use of the common resource, the arbitration supervisor begins a new arbitration period as described above.

In microcomputer systems with a cache subsystem, the CPU cycles accessing cache (and thus not requiring access to the system bus) are cycles of minimum duration or zero wait state cycles. When CPU cycles extend beyond this minimum, they signal CPU requirements for the system bus. Thus CPU cycles of longer than the minimum duration signal CPU need for the system bus, the common resource.

In accordance with the invention, the CPU is provided with the means to generate a PREEMPT signal which will cause any device having gained access to the bus through the arbitration mechanism to terminate that access as has already been described. As will be described, the CPU's generation of PREEMPT is controlled by detecting a CPU cycle of duration longer than one required for a cache address.

However, the CPU's use of the system resource is arranged to conserve as much time as possible. More particularly, when a device which had gained access to the bus via an arbitration recognizes a preempt and initiates an orderly termination of its bus access, it signals its termination of the use of the bus. The arbitration supervisor responds to this indication by generating a new arbitration period. If the CPU was the device which had generated the preempt to require release of the bus, it will respond differently to the beginning of the arbitration period than will any other device contending for bus access. At the beginning of the arbitration period, each of the other devices contending for access to the bus places its priority value on the arbitration conductors. The CPU does not enter into this process at all; with the beginning of the arbitration period, the CPU actually begins using the bus.

In an embodiment of the invention which has actually been constructed, the minimum arbitration period is 300 nanoseconds. However a zero wait state bus cycle is less than 300 nanoseconds. Accordingly, whenever the CPU preempts and thereby gains access to the system bus, it can actually complete a cycle simultaneously with the arbitration process.

Accordingly, the present invention provides the CPU with means to preempt use of the system bus which had previously been distributed based on an arbitration mechanism. Furthermore, in accordance with the present invention, when the CPU obtains access to the system bus via its preempt signal, it can initiate a bus cycle which can be completed during the duration that other devices contend for access to the bus.

Thus in one aspect, the invention provides a multi-bus microcomputer system comprising:

a) a processor and a cache subsystem connected together by a CPU local bus, b) a random access memory, an arbitration supervisor and a plurality of other functional units connected together by a system bus, c) means coupling said CPU local bus and said system bus, d) where both said CPU local bus and said system bus include a plurality of conductors dedicated to arbitrating access to said system bus by at least some of said plurality of other functional units, one of said plurality of said conductors providing a preempt signal, and e) a preempt signal source with inputs responsive to a CPU local bus cycle extending beyond a minimum duration, said preempt signal source having an output coupled to said CPU local bus for generating a preempt signal effective at any functional unit with access to said system bus for limiting a duration of said access in response to receipt of said preempt signal.

BRIEF DESCRIPTION OF THE DRAWINGS

FIG. 7A-E is a timing diagram illustrating several arbitration and grant cycles, one of which provides access to the system bus by a generic device and another of which provides access to the system bus by the CPU via a PREEMPT signal;

DETAILED DESCRIPTION

Figure 1:
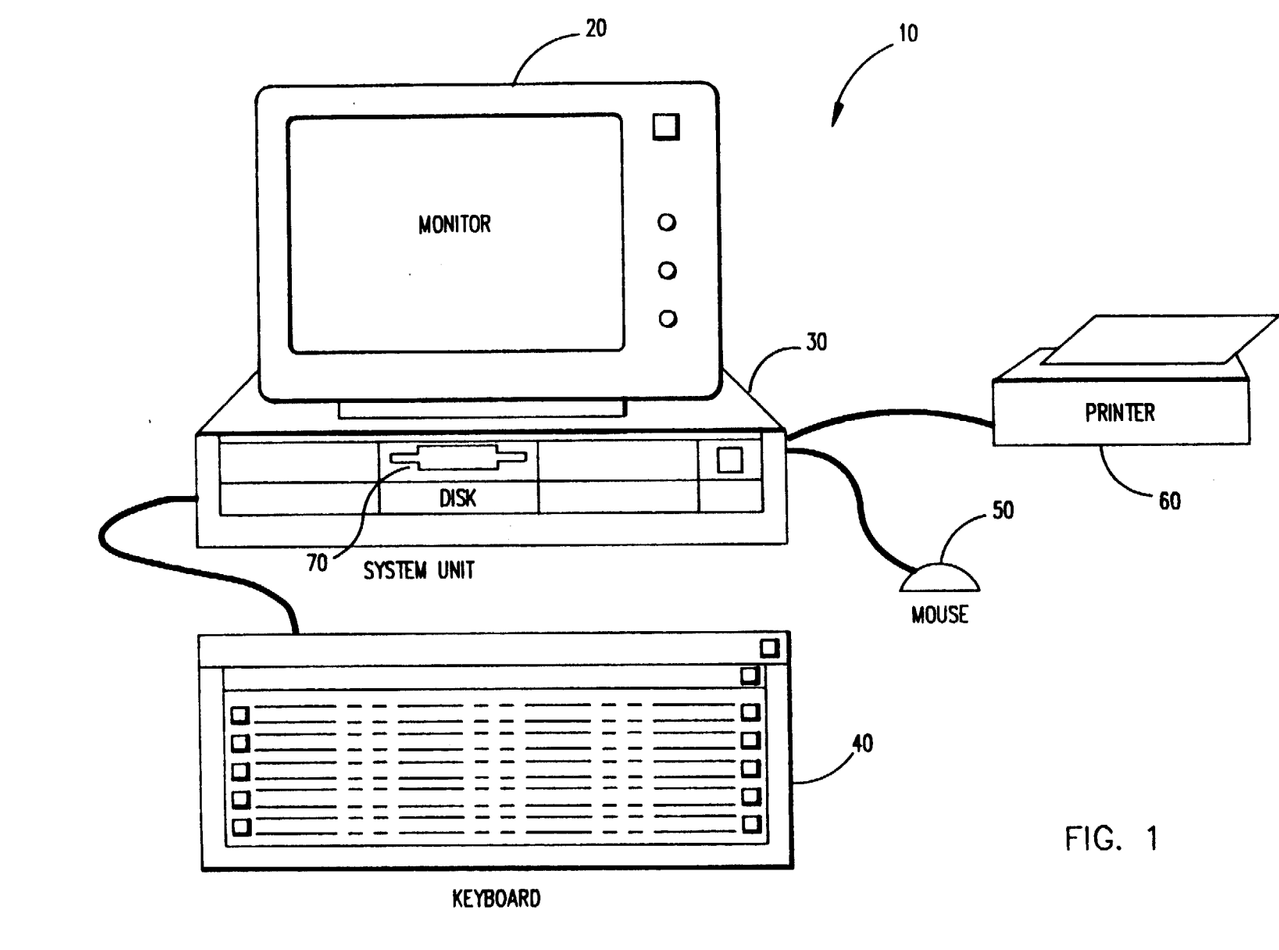
FIG. 1 is an overall three-dimensional view of a typical microcomputer system employing the present invention.

FIG. 1 shows a typical microcomputer system in which the present invention can be employed. As shown, the microcomputer system 10 comprises a number of components which are interconnected together. More particularly, a system unit 30 is coupled to and drives a monitor 20 (such as a conventional video display). The system unit 30 is also coupled to input devices such as a keyboard 40 and a mouse 50. An output device such as a printer 60 can also be connected to the system unit 30. Finally, the system unit 30 may include one or more disk drives, such as the disk drive 70. As will be described below, the system unit 30 responds to input devices such as the keyboard 40 and the mouse 50, and input/output devices such as the disk drive 70 for providing signals to drive output devices such as the monitor 20 and the printer 60. Of course those skilled in the art are aware that other and conventional components can also be connected to the system unit 30 for interaction therewith. In accordance with the present invention, the microcomputer system 10 includes (as will be more particularly described below) a cache memory subsystem such that there is a CPU local bus interconnecting a processor, a cache control and a cache memory which itself is coupled via a buffer to a system bus. The system bus is interconnected to and interacts with the I/O devices such as the keyboard 40, mouse 50, disk drive 70, monitor 20 and printer 60. Furthermore, in accordance with the present invention, the system unit 30 may also include a third bus comprising a Micro Channel (TM) architecture for interconnection between the system bus and other input/output devices.

Figure 2:
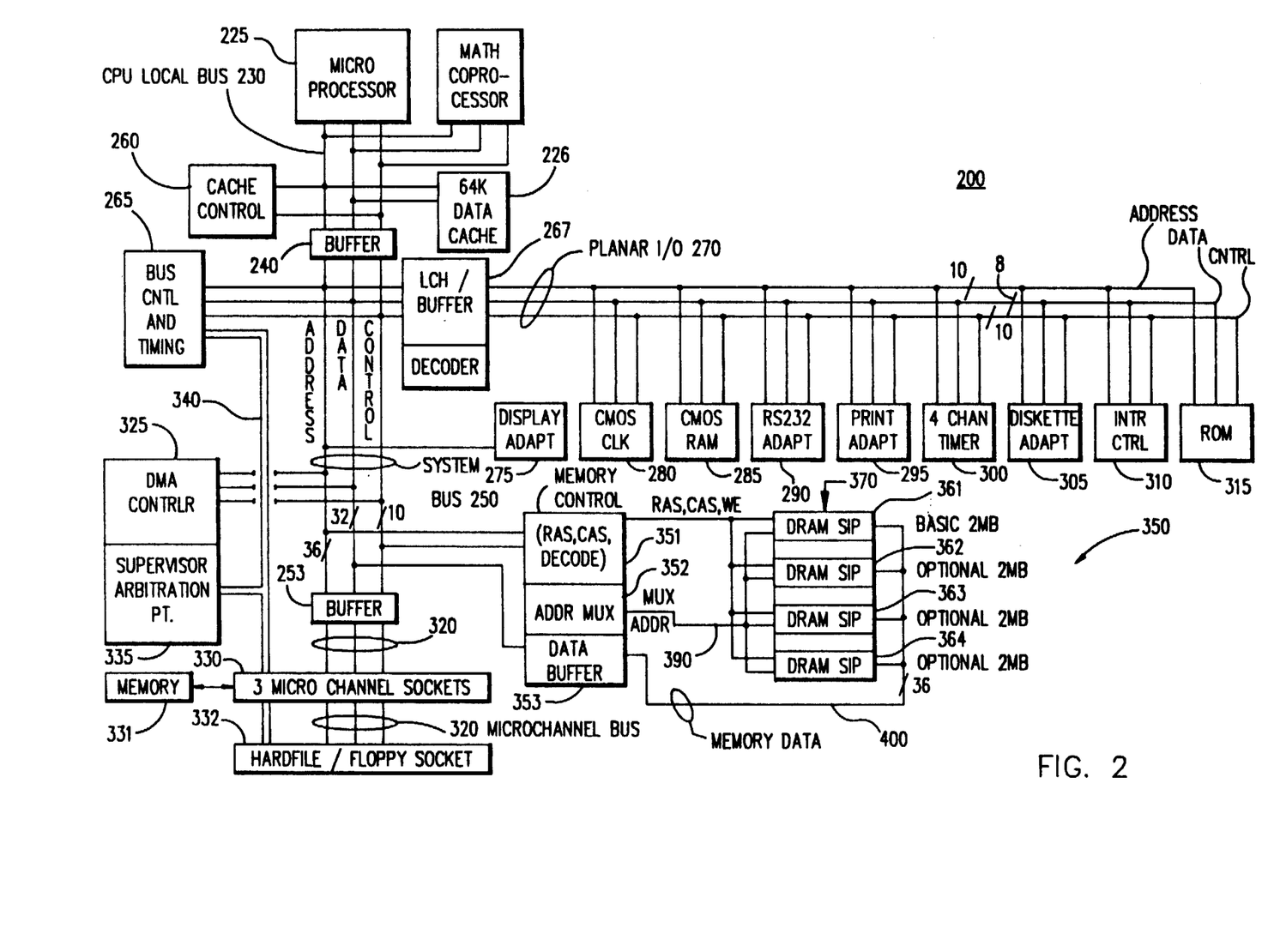
FIG. 2 is a detailed block diagram of a majority of the components of a typical microcomputer system employing the present invention.

FIG. 2 is a high level block diagram illustrating the various components of a typical microcomputer system in accordance with the present invention. A CPU local bus 230 (comprising data, address and control components) provides for the connection of a microprocessor 225 (such as an 80386), a cache control 260 (which may include an 82385 cache controller a cache 226) and a random access cache memory 255. Also coupled on the CPU local bus 230 is a buffer 240. The buffer 240 is itself connected to the system bus 250, also comprising address, data and control components. The system bus 250 extends between the buffer 240 and a further buffer 253. The system bus 250 is also connected to a bus control and timing element 265 and a DMA controller 325. An arbitration control bus 340 couples the bus control and timing element 265 and arbitration supervisor 335. The main memory 350 is also connected to the system bus 250. The main memory includes a memory control element 351, an address multiplexer 352 and a data buffer 353. These elements are interconnected with memory elements 361 through 364, as shown in FIG. 2. A memory data bus 400 couples the buffer 353 to elements 361-364. The multiplexer 352 is coupled to memory elements 361-364 of memory 370 via bus 390.

A further buffer 267 is coupled between the system bus 250 and a planar bus 270 of an I/O system 200. The planar bus 270 includes address, data and control components. Coupled along the planar bus 270 are a variety of I/O adaptors and other components such as the display adaptor 275 (which is used to drive the monitor 20), a clock 280, additional random access memory 285, an RS 232 adaptor 290 (used for serial I/O operations), a printer adaptor 295 (which can be used to drive the printer 60), a timer 300, a diskette adaptor 305 (which cooperates with the disk drive 70), an interrupt controller 310 and read only memory 315. The buffer 253 provides an interface between system bus 250 and an optional feature bus such as the Micro-Channel (TM) bus 320 represented by the Micro-Channel (TM) sockets 330. Devices such as memory 331 and socket 332 may be coupled to the bus 320.

Figure 8:
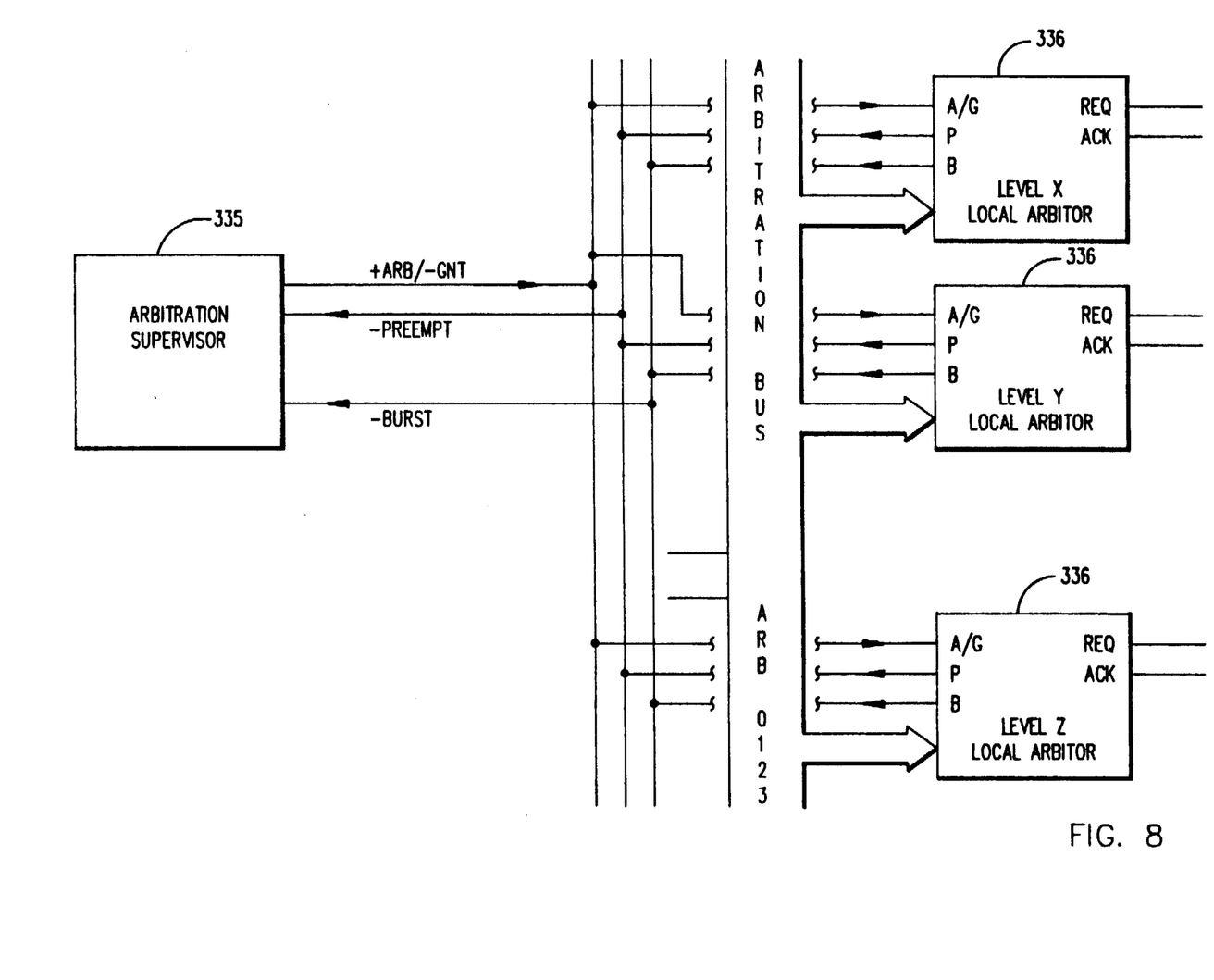
FIG. 8 shows the relationship between the central arbitration supervisor 335 and arbitors 336 associated with other devices.

FIGS. 8-11 are useful in explaining the arbitration mechanism. Referring now to FIG. 8, the relationship between the arbitration supervisor 335 and a local arbiter unit 336, representative of all local arbiter units, will be described. In general, when a device wants access to the system bus 250 to transfer data, a local arbiter unit 336 will receive a request signal from the particular device to which the arbiter unit is related. The request signal is converted to a /PREEMPT signal which is generated by the local arbiter and transmitted to the arbitration supervisor 335 and each of the local arbiters over the /PREEMPT line of the arbitration bus. It should be noted in the specific embodiment of this invention that the /PREEMPT lines are OR'ed together and thus it is irrelevant to the arbitration supervisor 335 which particular device generates the request. The arbitration supervisor 335 generates the ARB/$\overline{\text{GRANT}}$ signal at an appropriate time as determined by the HLDA and +REFRESH memory signal from a refresh controller (not shown) well known to those skilled in the art, in response to a /PREEMPT signal from one or more of the local arbiters 336. HLDA is one signal of the pair HLDA and HRQ (or HOLD) which in a single bus system was exchanged between the arbitration supervisor 335 and the CPU. In dual bus systems these signals are between the arbitration supervisor and the 82385.

Thus when any one of the devices desires to contend for use of the system bus 250, it generates a request signal to its corresponding local arbiter 336 which then generates a /PREEMPT signal over the /PREEMPT line of the arbitration bus. Then at the appropriate time when the bus becomes available, as determined by the HOLD and the +REFRESH signal from the refresh controller, the arbitration supervisor 335 generates the +ARB state of the ARB/$\overline{\text{GRANT}}$ signal over the arbitration bus to each one of the local arbiters 336. In response to the +ARB state, each of the local arbiters 336 which desires access to the system bus 250 drives its priority level onto respective lines ARB0-ARB3 of the arbitration bus. Then each of the local arbiters desiring access to the system bus 250 compares its designated priority level with the priority level on the arbitration bus and takes itself out of contention for the bus in the event its priority level is lower than that being driven onto the arbitration bus. Thus at the end of the arbitration cycle, only that one of the local arbiters having the highest priority level during that arbitration cycle remains in contention for the bus and thus gains control of the bus when the $\overline{\text{GRANT}}$ state is received from the arbitration supervisor 335 over the ARB/$\overline{\text{GRANT}}$ line.

Figures 9, 10:
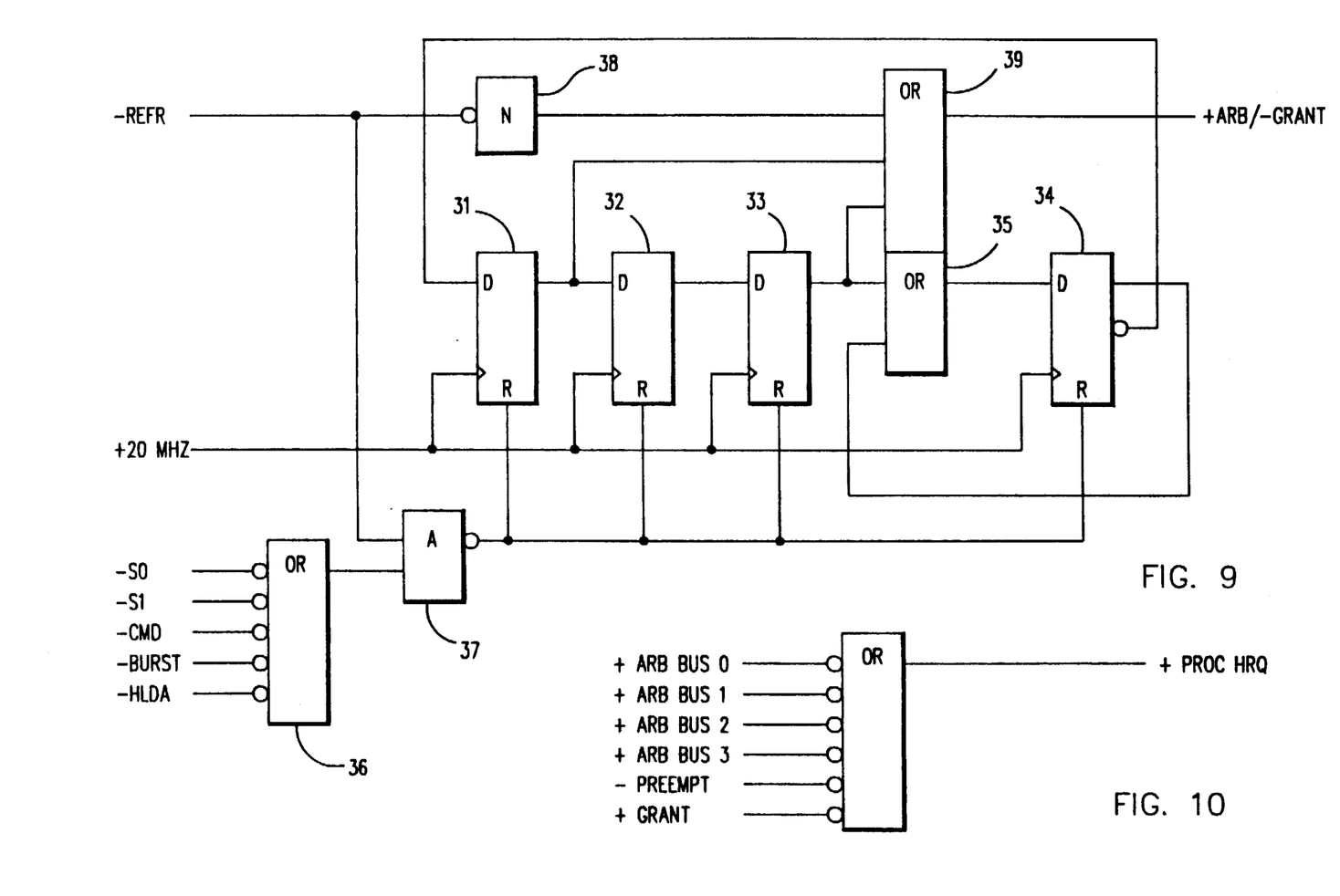
FIGS. 9 and 10 taken together are a block diagram of an arbitration supervisor 335.
Figure 11:
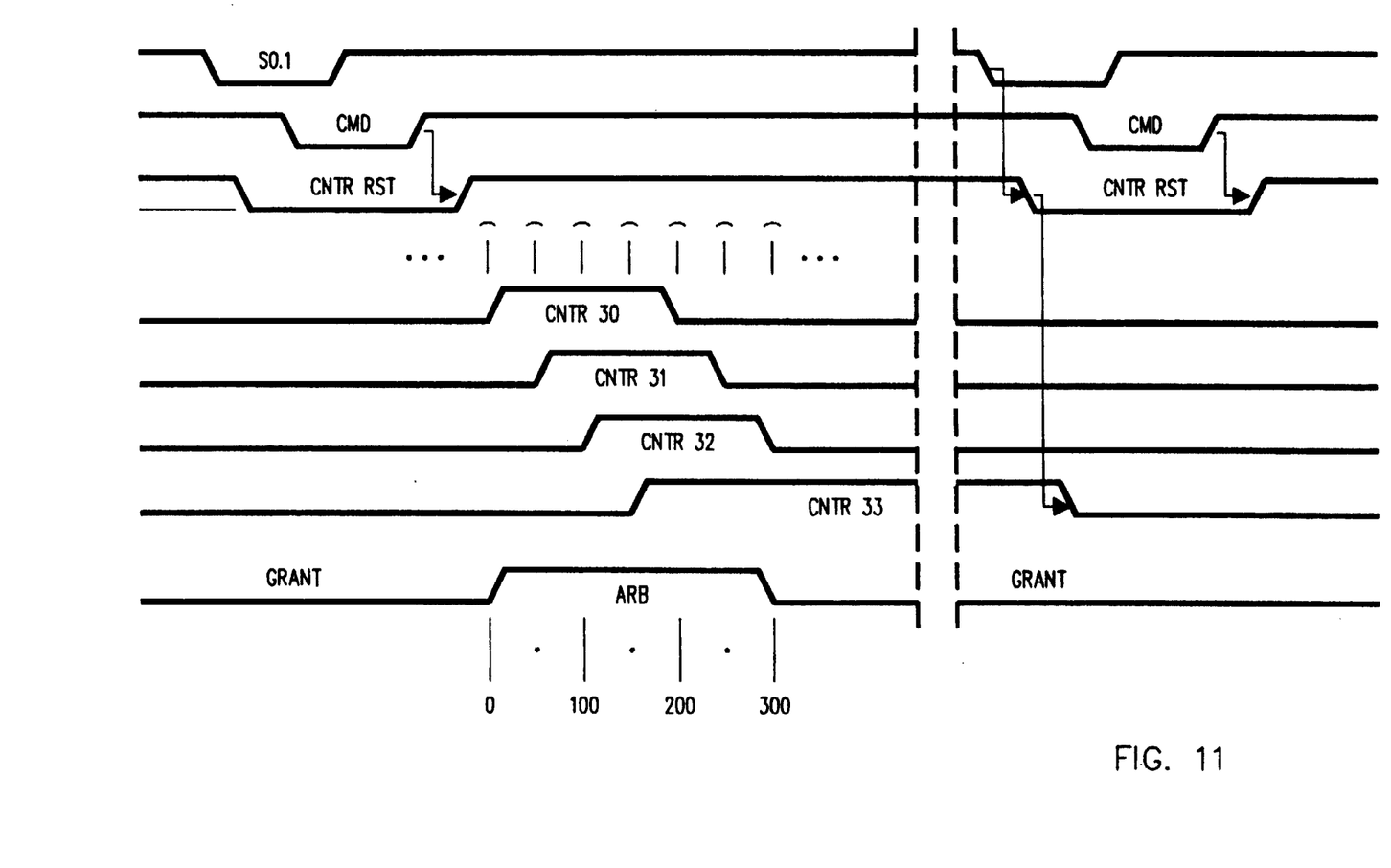
FIG. 11 is a timing diagram for explaining the operation of FIG. 8.

Referring now to FIGS. 9 and 10, a more detailed circuit description of the arbitration supervisor 335 is illustrated. The arbitration supervisor 335 comprises a modified Johnson ring timing chain including counters 31 through 34 and OR gate 35, OR gate 36, NAND gate 37, inverter 38 and OR gate 39. Assuming the bus begins in an idle condition with the CPU 225 "owning" the bus, but not using it, the circuit operation will be described hereinafter in conjunction with the timing charts of FIG. 11. In the aforesaid condition, ARB-/e,ovs/GRANT/ is then active low, and the arbitration priority levels ARB0 through ARB3 all have a value of one. The modified Johnson ring timing chain is held reset by the +HLDA signal through the OR gate 36 and the NAND gate 37. When a device needs access to the bus, the /PREEMPT signal is activated. As shown in FIG. 10, the /PREEMPT signal going active results in the output of the gate going positive, representing a PROCESSOR HOLD REQUEST (+PROC HRQ) signal. The +ARB0 through +ARB3 signal and a +GRANT signal are also input to the OR gate of FIG. 10 to insure that the CPU 225 will not interfere with bus transfers by other devices. The +PROC HRQ signal results in deactivating +HLDA which results in the reset signal (output from OR gate 36) being removed from counters 31 through 34. It should be understood that inputs −S0, −S1, −CMD and −BURST must be inactive in order for +HLDA to remove the reset signals from the aforesaid counters 31 through 34, as illustrated in FIG. 11. The −S0 signal represents the WRITE cycle, and the −S1 signal represents the READ cycle. The −CMD signal is generated by the current bus master a specified time period after −S0 or −S1. During READ cycles the −CMD instructs the slave device to place READ data onto the bus and during WRITE cycles −CMD is activated for validation of WRITE data.

On the next (20 MHz) clock pulse, after +HLDA is deactivated, the counter 31 output is set causing the output of OR gate 39 to go high (+ARB) indicating an arbitration timing period. The OR gate 39 output remains high until the output of counter 33 goes low sometime after the output of counter 34 has gone high. This establishes a 300 nanosecond timing pulse for the ARB/$\overline{\text{GRANT}}$ signal. The output from counter 34 remains set until the device begins a bus cycle by 5 either activating −S0 or −S1. The output is then reset, and the counters 31 through 34 are ready to begin timing again at the end of the current bus cycle. If no devices are requesting bus service, the bus returns to the idle condition and control is returned to the processor. HLDA is reactivated and the bus is now available for processor operations.

Figure 3:
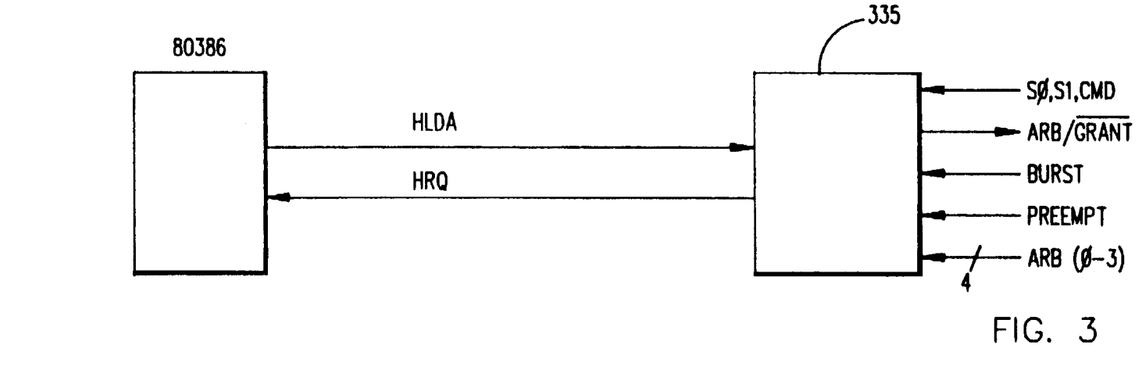
FIG. 3 illustrates how the arbitration supervisor and CPU are connected in accordance with a single bus microcomputer system.

FIG. 3 shows the interconnection between an 80386 CPU, such as the microprocessor 225, and the arbitration supervisor 335. The input/output signals connected at the right of the arbitration supervisor 335 are described in the referenced applications. More particularly, the output signal ARB/$\overline{\text{GRANT}}$ is the signal defining whether the arbitration mechanism is in the arbitration state (during which devices contending for access to the system resource place their priority level on the arbitration conductors) or in a grant phase (wherein the device obtaining access to the common resource can employ that resource to the exclusion of other devices which may have been contending for access). Another input signal to the arbitration supervisor 335 is the PREEMPT signal which has already been described. Finally, the input to the 335 arbitration supervisor represented by ARB[0-3] is the arbitration conductors which, during the arbitration phase, are driven by devices contending for access with their own priority levels. The input/output connections on the left side of the arbitration supervisor 335 show its interconnection with the 80386, in a typical single bus microcomputer system. The signals HLDA and HRQ (sometimes referred to as HOLD) are handshaking mechanisms whereby the arbitration supervisor 335 can request access to the system resource to the exclusion of the 80386 (HRQ). When the 80386 acknowledges (HLDA) then the arbitration supervisor 335 can distribute access to the resource. In single bus microcomputer systems, the CPU cannot preempt on its own behalf. This raises the undesirable potential for the CPU to be locked out of the common resource by a device which is allowed to burst.

Figure 4:
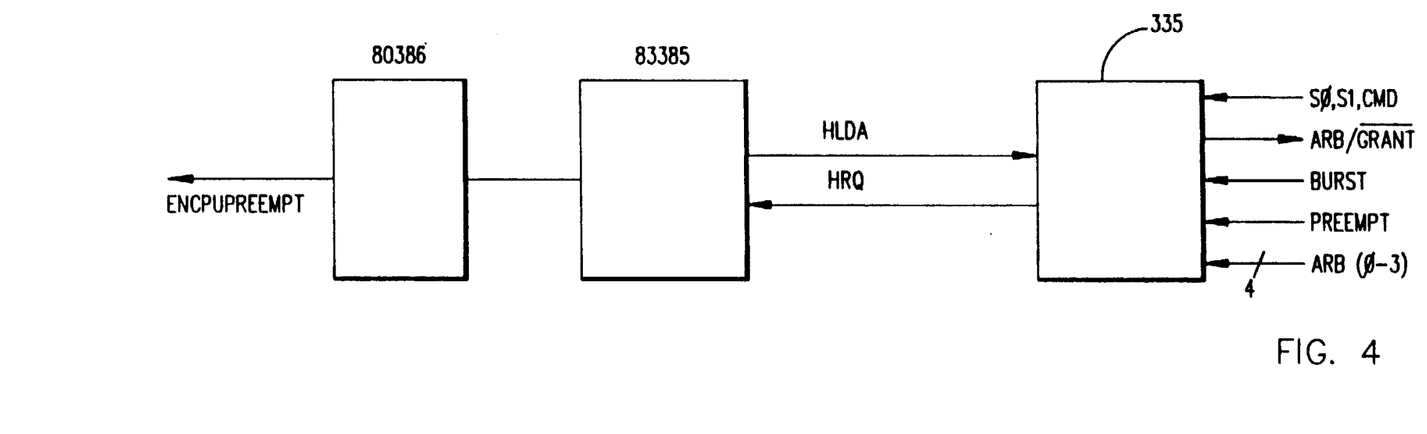
FIG. 4 illustrates how the arbitration supervisor, CPU and cache control are interconnected in accordance with the present invention.
Figure 5:
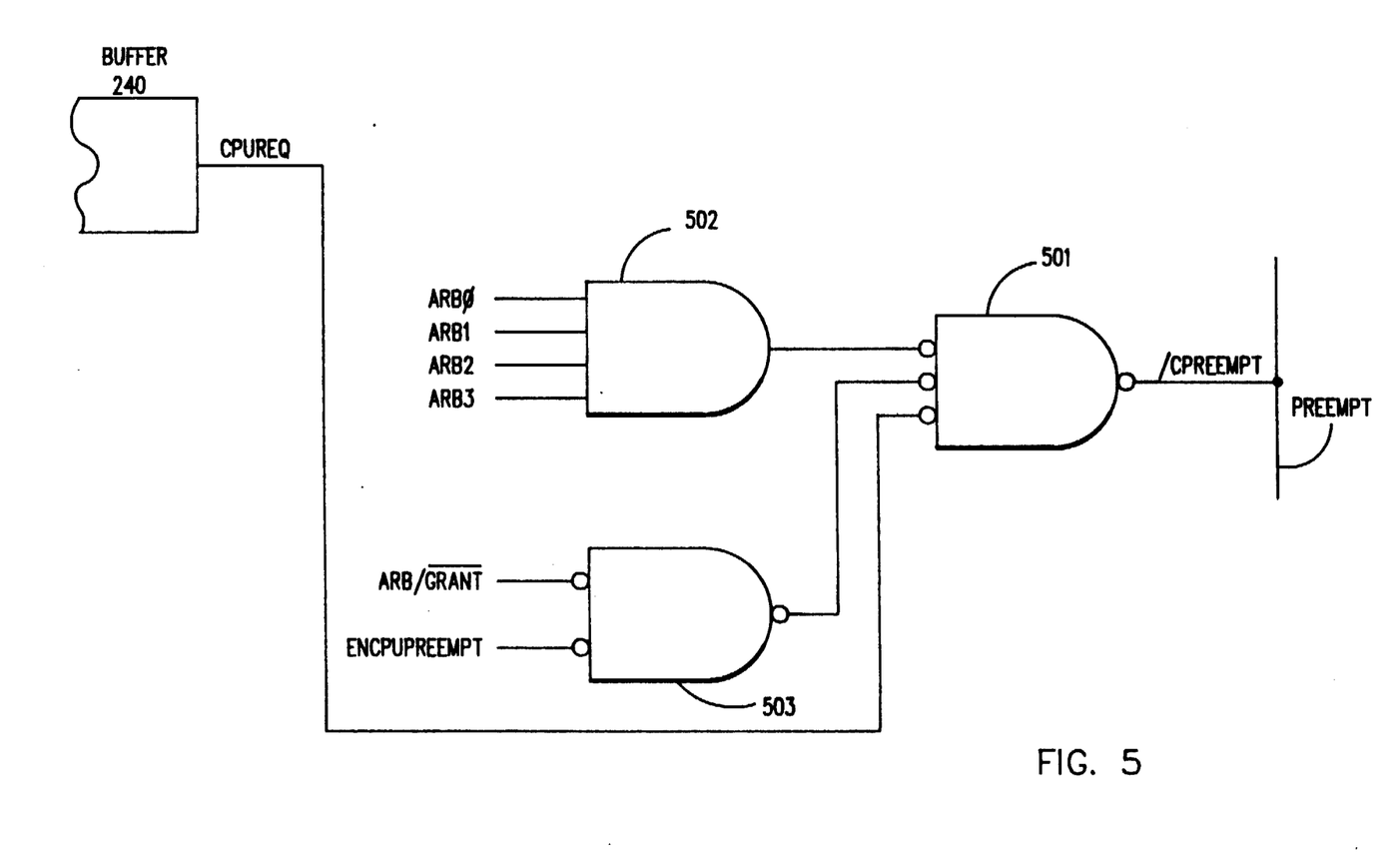
FIG. 5 illustrates the apparatus associated with the CPU to generate a PREEMPT signal.
Figure 6:
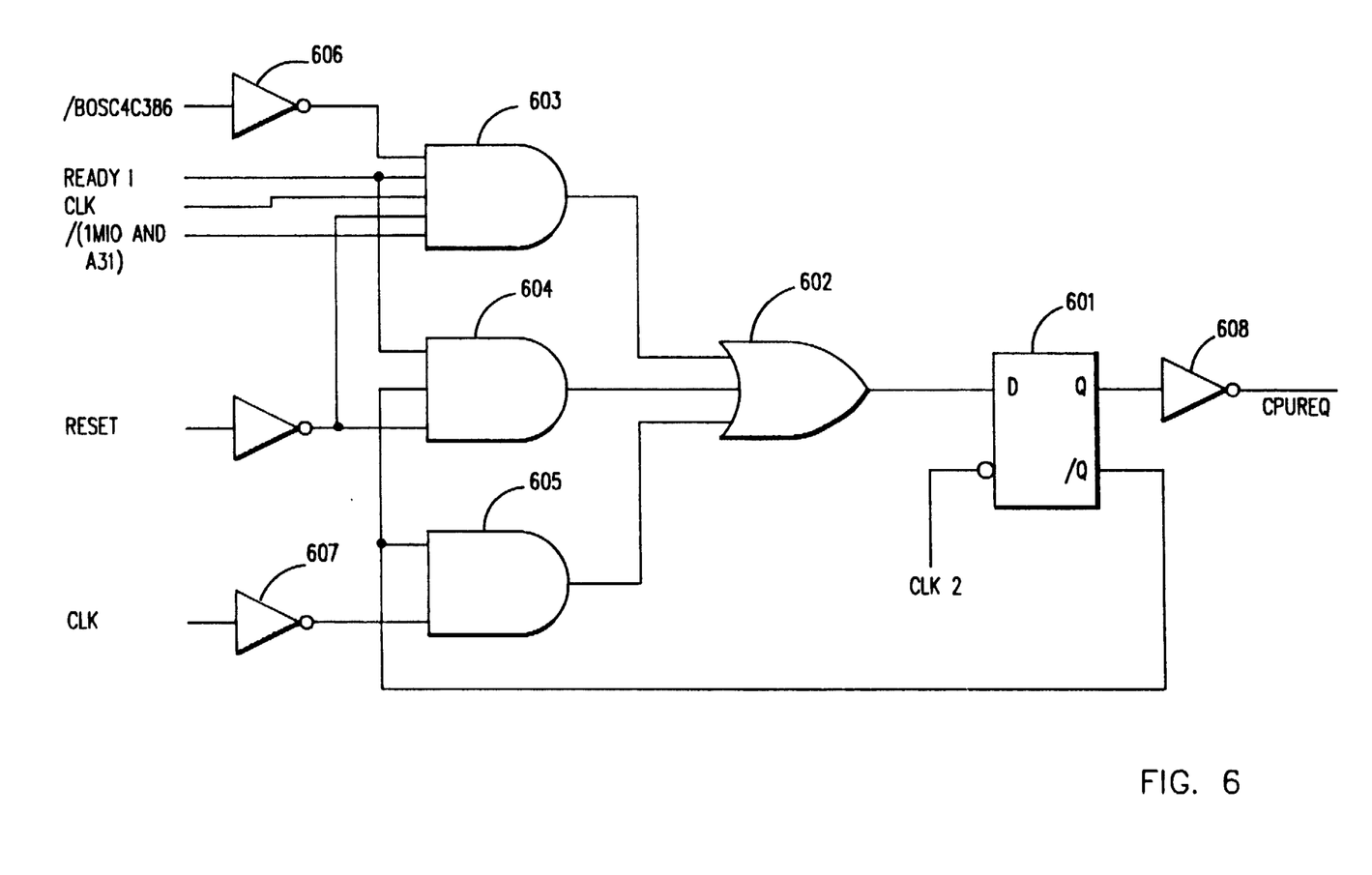
FIG. 6 illustrates the logic associated with the CPU for generating a signal CPUREQ which is used in generation of a PREEMPT signal by the CPU.

FIG. 4 is a block diagram showing selected interconnections, in a dual bus microcomputer system which employs the 80386 CPU and an 82385 cache controller. The input/output connections on the right side of the arbitration supervisor 335 of FIG. 4 are identical to those in FIG. 3 and will not be described again. The important point illustrated in FIG. 4 is that the supervision of the arbitration supervisor 335 is now implemented by the 82385 cache controller, since it is that element to which the HRQ and HLDA signals are connected. Absent some other arrangement, then, the 80386 CPU could be frozen out of use of the common resource. The present invention provides that other mechanism and does so, to a large extent, without impacting other devices accessed to the common resource. FIGS. 5 and 6, taken together, illustrate how the signal CPREEMPT, and its antecedent CPUREQ, are generated.

Referring first to FIG. 6, the logic there can be considered part of the cache control 260. The logic is provided to generate the signal CPUREQ which can be considered a control signal input to the control portion of the buffer 240. The control signal CPUREQ is developed from the inputs shown at the left including /BUSYCYC 386, READYI, CLK, RESET and (/M/IO & A31). The latter signal is the decoded address to the coprocessor. The signals BUSYCYC 386, READYI and /(/M/IO & A31) are active low signals such that for example when the flip-flop 601 becomes set (through a high input at its D input), its output is high and the CPUREQ signal is low (active). In addition to the flip-flop 601, the logic of FIG. 6 includes an OR gate 602, three AND gates 603–605 and inverters 606–608.

Essentially the inputs to AND gate 603 detect an 80386 cycle which extends beyond the zero wait state and which is not at the same time a cycle dedicated to the coprocessor. Once the condition is detected, the flip-flop 601 becomes set, and can only be reset at a clock time CLK2 when the condition has terminated. Gates 604 and 605 are provided to reset flip-flop 601 when CLK is high and READYI is (active) low. This condition occurs when a CPU bus cycle is completed.

A CPU local bus cycle extending beyond the zero wait state (and which is also not a coprocessor dedicated cycle) is a cycle which requires access to the system bus. Accordingly the CPUREQ under those circumstances becomes active, that is, goes low. The effect of this signal is shown in FIG. 5.

FIG. 5 shows logic which is associated with the system bus 250. As shown in FIG. 5 the control element of the buffer 240 has an output CPUREQ (which is driven by the same signal shown in FIG. 6). The CPUREQ is one input to a gate 501 whose output CPREEMPT is, in effect, a preempt signal generated by the 80386. As see in FIG. 5 the signal /CPREEMPT is coupled to the PREEMPT conductor which is one of the inputs to the arbitration supervisor 335 (see FIG. 3 or 4). The signal /CPREEMPT is generated by the logic shown in FIG. 5 including the gates 501-503. A second input to the gate 501 is the output of gate 503, one of whose inputs is the ARB/$\overline{\text{GRANT}}$ signal (identical to the output of the arbitration supervisor 335). The other input is ENCPUPREEMPT. The latter is an output of the 80386. When inactive, this signal will inhibit /CPREEMPT from ever becoming active. Thus when ENCPUPREEMPT is inactive, the 80386 cannot preempt. ENCPUPREEMPT may be controlled by a user-settable switch or a software switch, depending on the requirements of other system devices and/or software. Under normal circumstances, ENCPUPREEMPT will be active, thus enabling the 80386 to preempt. When the ARB/$\overline{\text{GRANT}}$ indicates the arbitration process is in the grant phase (and ENCPUPREEMPT is active) then the output of gate 503 will be active. An active output of the gate 503 along with an active CPUREQ will enable the production of an active /CPREEMPT. The gate 503 will prevent generation of an active /CPREEMPT during the arbitration phase, and only allow an active /CPREEMPT during the grant phase of the arbitration process. The gate 502 is used to monitor the state of the arbitration conductors and will prevent generation of an active /CPREEMPT if all conductors are (active) high, indicating that other devices are not arbitrating for the bus, i.e. the CPU owns the common resource.

Figure 7A:
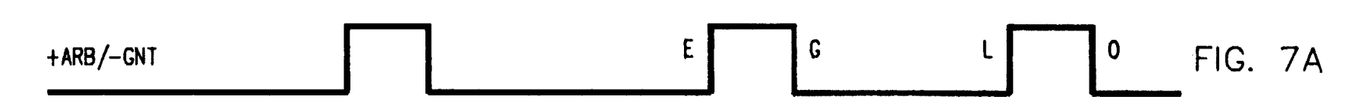
Figure 7B:
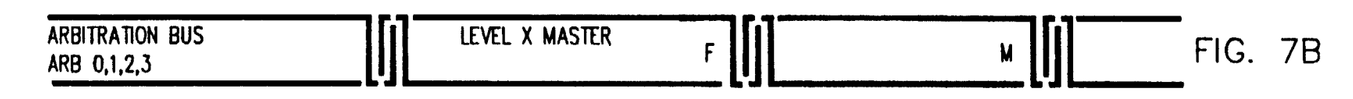
Figure 7C:
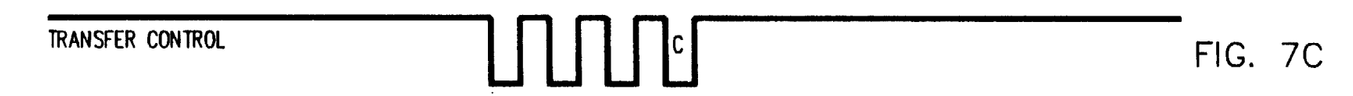
Figure 7D:
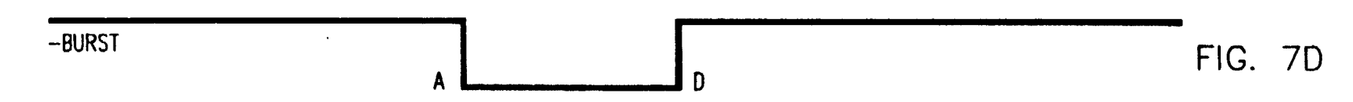
Figure 7E:
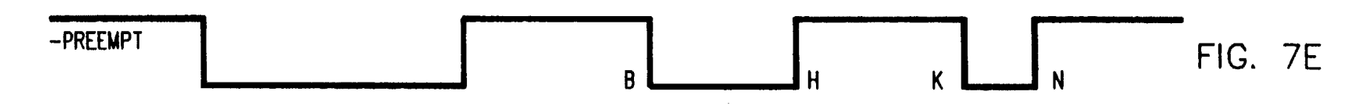

Accordingly, by the logic shown in FIGS. 5 and 6, for cycles on the CPU local bus which are not dedicated to the coprocessor, and which extend beyond a minimum duration (zero wait state), the CPU may preempt, and will preempt, if the arbitration mechanism is in its grant phase. The effect of this preemption will now be described in connection with FIGS. 7A–7E.

FIGS. 7A-7E are similar to FIG. 4 in application Ser. No. 030,786 and illustrates:

1) use of the system bus by a burst device (a-d), 2) preemption of that device by a typical device through use of the PREEMPT signal (b-h),
3) acquisition of the bus by the CPU via use of the /CPREEMPT signal (k-o), and
4) simultaneous with use of the bus by the CPU, arbitration for use of the bus by another device (m).

More particularly, for purpose of illustration assume that a Burst mode device has gained control of the system bus as illustrated (a) in FIG. 7D. When another device along the system bus asserts PREEMPT (b), the Burst device presently in control completes its current transfer as illustrated (c)—FIG. 7C. On completion of the current transfer, the Burst device that is relinquishing control of the system bus removes its Burst signal from the Burst line as shown at (d)—FIG. 7D. This Burst device will not participate in the next arbitration cycle. The arbitration supervisor 335 then places the ARB/GRANT into the ARB state (e)—FIG. 7A. The same transition represents the beginning of another arbitration cycle and arbitration for the system bus begins at (f)—FIG. 7B. After the ARB/GRANT signal goes low, control of the system bus is granted to the new device as illustrated at (g)—FIG. 7A. The new device which has gained control of the system bus then removes its PREEMPT signal in response to the GRANT signal as shown at (h)—FIG. 7E.

Sometime later, in the example of FIGS. 7A-7E and based on conditions reflected on the CPU local bus 230, the CPU asserts /CPREEMPT which is reflected in PREEMPT (k)—FIG. 7E. As has already been explained, this will result in a new arbitration cycle beginning as illustrated (1)—FIG. 7A. The arbitration cycle, as shown in FIG. 7A, extends from (l-o). During this arbitration cycle, the CPU actually employs the system bus, and at the beginning of that cycle the CPU deasserts its PREEMPT signal (n)—FIG. 7E. During the CPU's use of the system bus, other devices which may contend for access to the system bus arbitrate for that resource beginning at (m)—FIG. 7B. At the end of the CPU cycle, when it has completed use of the system bus (o), a new arbitration has been completed so that immediately thereafter some further device (if any were contending for access to the system bus) can employ that resource in the duration beginning at (o)—FIG. 7A.

The /CPREEMPT signal is only active when a CPU bus cycle extends beyond a predetermined duration (beyond a zero wait state, for example). During the arbitration phase (ARB/GRANT high), the CPU cache control 260 is released from the hold state by the supervisor 335 dropping HRQ and is allowed to run one or more cycles.

The completion of a CPU cycle, allowed to use the system bus by use of the preempt mechanism, is detected by READYI active with CLK high. By virtue of the logic of FIG. 6, under these conditions the flip-flop 601 is reset and CPUREQ goes inactive.

The logic equations which have been referenced above are reproduced immediately below. In this material the symbols have the following meanings associated with them:

| Symbol | Definition |
| --- | --- |
| / | Negation |
| := | A registered term, equal to |
| = | A combinatorial term, equal to |
| & | Logical AND |
| + | Logical OR |

| | Logic Signals |
| --- | --- |
| ARB[0-3] | Defined in the copending applications |
| ARB/GRANT | Defined in the copending applications |
| /(/M/IO & A31) | Decoded math coprocessor address |
| /CPREEMPT | See FIG. 5 |
| /CPUREQ | See FIG. 6 |
| ENCPUPREEMPT | Programmable bit to enable or disable ability of the CPU to generate /CPREEMPT |
| PREEMPT | Defined in the copending applications, modified in this application to the extent it may be generated by /CPREEMPT |

Logic Equations

```
/BREADY385:=/BUSCYC385 & /BREADY & MISS1                                    (1)
/BT2:=BUSCYC385 & PIPECYC385 & /BADS & CLK & BT2                            (2)
   + BUSCYC385 /PIPECYC385 BADS CLK & NACACHE & BT2
   + MISS1 & /BUSCYC385 & /BADS & /(BW/R) & CLK & NCA & /BREADY
   + /MISS1 & /BREADY & /BUSCYC385 & CLK
   + /BT2 & BREADY & NACACHE
   + /CLK & /BT2

/BUFWREND:=WBS & /BUSCYC385 & /BREADY & CLK                                 (3)

/BUSCYC385:=BUSCYC385 & /BADS & CLK                                         (4)
   + BUSCYC385 & /PIPECYC385 & CLK
   + BUSCYC385 & /BT2 & CLK
   + /BUSCYC385 & BREADY
   + /BUSCYC385 & /CLK

/BUSCYC386:=BUSCYC386 & /ADS & CLK & /RESET                                 (5)
   + BUSCYC386 & /PIPECYC386 & CLK & /RESET
   + /BUSCYC386 & CPUREADY & /RESET
   + /BUSCYC386 & /CLK & /RESET

/CPUNA:=/MISS1 & CLK & CPUNA & /NACACHE                                     (6)
   + /MISS1 & CLK & CPUNA & /BREADY & /BUSCYC385
   + /CPUNA & /CLK
   + /CPUNA & /MISS1 & CLK
   + /CPUNA & CLK & BREADY
   + /CPUNA & BUSCYC385 & NACACHE & CLK

LEAB:=/LEAB & /BUSCYC386 & /CPUREADY & (W/R) & CLK & ADS                    (7)
```

```
+ LEAB & BUFWREND & /CLK
+ LEAB & WBS & CLK

/MISS1:=MISS1 & BUSCYC385 & CPUNA & /BADS & /(BW/R) & CLK & NCA        (8)
+ MISS1 & BUSCYC385 & /BADS & /(BW/R) & CLK & NCA & /BREADY
+ /MISS1 & /CLK
+ /MISS1 & BREADY

/PIPECYC385:=PIPECYC385 & /BADS & /BUSCYC385 & CLK & /BREADY           (9)
+ PIPECYC385 & /MISS1 & BT2 & /BUSCYC385 & CLK & /BREADY
+ /PIPECYC385 & /CLK

/PIPECYC386:=                                                          (10)
 PIPECYC386 & /ADS &CLK & /CPUREADY & /RESET & /BUSCYC386
+ /PIPECYC386 & /CLK & /RESET

/CPUREADY=/READYO & /(W/R)                                             (11)
+ /BRYDEN & /BREADY & MISS1 & /BUSCYC385
+ /READYO387
+ /BREADY385 & (W/R) & /LEAB
+ /READYO & (W/R) & NAC
+ /RDY387PAL
```

In the foregoing logic equations the following signals are described or referred to in the cited Intel publications:

ADS
BADS
BRDYEN
BREADY
(BW/R) actually referred to as BW/R, the parenthesis are used to indicate that the entire term is one signal
CLK
READYO
RESET
WBS
(W/R) actually referred to as W/R, the parenthesis are used to indicate the entire term is a single signal ADS, when active indicates a valid address on the CPU local bus 230. BADS, when active indicates a valid address on the system bus 250. BRDYEN is an output of the 82385 which is a antecedent of the READY signals. BREADY is a ready signal from the system bus 250 to the CPU local bus 230. BW/R defines a system bus 250 Write or Read. CLK is a processor clocking signal which is in phase with the processor 225. READYO is another output of the 82385 in the line of ready signals. RESET should be apparent. WBS indicates the condition of the Write Buffer. (W/R) is the conventional Write or Read signal for the CPU local bus 230.

Equations (1)–(11) define:
BREADY385
BT2
BUFWREND
BUSCYC385
BUSCYC386
CPUNA
LEAB
MISS1
PIPECYC385
PIPECYC386
CPUREADY
in terms of the defined signals, the signals described or referred to in the cited Intel publications and NCA, NACACHE, READY0387 and RDY387-PAL.

BREADY385 is a signal like BREADY which in an embodiment actually constructed was modified to accommodate a 64K cache. In the case of a 32K cache (as recommended by the manufacturer) BREADY can be used in lieu of BREADY385.

BT2 reflects the state of the system bus 250. The state BT2 is a state defined in the cited Intel publications.

BUFWREND represents the end of a buffered write cycle.

BUSCYC385 also reflects the state of the system bus 250. It is high for bus states BTI, BT1, BT1P and low for bus states BT2, BT2P and BT2I (again these are bus states referenced in the cited Intel publications).

BUSCYC386 is high during CPU local bus 230 states TI, T1, T1P, T2I and low during T2. It is also low for T2P unless T2I occurs first.

CPUNA is a signal to the 80386 allowing pipelined operation.

LEAB is the latch enable (into buffer 240) for posted writes.

MISS1 is active defining the first cycle in a double cycle for handling 64 bit reads to cacheable devices.

PIPECYC385 is active during BT1P (which is a bus state referred to in the cited Intel publications.

PIPECYC386 is low during state T1P of the CPU local bus 230.

CPUREADY is the ready input to the 80386.

NCA is a signal created by decoding the address component on the CPU local bus 230 to reflect, when active, a non-cacheable access. Cacheability is determined by a tag component (A31 to A17) and programmable information defining what tags (if any) refer to cacheable as opposed to non-cacheable addresses.

NACACHE is a signal similar to the BNA signal.

BNA is a system generated signal requesting a next address from the CPU local bus 230, and is referenced in the cited Intel publications. NACACHE differs from BNA only in respect of the fact that BNA is created for 32K cache while NACACHE is created for a 64K cache. So long as the cache memory is 32K, as cited in the Intel publications the NACACHE signal referred to here could be replaced by the BNA signal.

READY0387 is the ready output of the 80387 math coprocessor.

RDY387PAL is an output of external logic used in the event a 80387 math coprocessor is not installed to prevent the absence of the math coprocessor from interfering in system operations.

Thus it should be apparent that by use of the invention, in dual bus microcomputer system employing an 80386 processor and 82385 cache controller, the processor is conditionally allowed to preempt for use of the system bus under specified circumstances. More particularly, for local bus cycles extending beyond a predetermined duration, the processor can assert /CPREEMPT on the condition that there are other users contending for access to the resource and the preempt option has been enabled (ENCPUPREEMPT). However, when the preempt becomes effective (as signalled to the processor by the arbitration supervisor), then two events occur simultaneously. The first event is that the processor accesses the system bus. This access will not interfere with any other potential bus users since during the period of the processor's access, other contending users are in an arbitration phase. Thus simultaneous with the access to the system bus by the processor, other users may arbitrate for access to the grant phase following the processor's use of the bus. Accordingly, by use of the invention, the processor is enabled to use the system bus even if other user devices are contending, simultaneously, for access to the bus. By overlapping the processor's use of the bus with the arbitration phase (entered into by other devices), bus utilization and efficiency are increased.

While a particular embodiment of the invention has been described herein, it should be apparent that the invention is not limited to the specific example described herein and rather should be construed in accordance with the claims attached hereto.

We claim:

1. A multi-bus microcomputer system comprising
a) a processor and a cache subsystem connected together by a CPU local bus;
b) a random access memory, an arbitration supervisor and a plurality of other functional units connected together by a system bus, said other functional units having assigned relative priority values;
c) means coupling said CPU local bus and said system bus;
d) said arbitration supervisor being responsive to service request from said other functional units for terminating control of the system bus by one of said other functional units and for initiating arbitration cycles to grant access to the system bus to one of the requesting functional units at the end of each of said arbitration cycles in accordance with their priority values;
e) said arbitration supervisor being effective to permit processor access to the system bus while no one of said other functional units have access to or requires access to said system bus;
f) logic means, couple to said arbitration supervisor and responsive to processor signals requesting access to said system bus while one of said other functional units has control of said system bus and at least a second other functional unit is requesting service, for terminating said control of the system bus by said one functional unit and thereafter causing said arbitration supervisor to initiate an arbitration cycle for said other functional units, during which cycle no functional unit has control of the system bus; and
g) means coupled to the arbitration supervisor and effective during said last-mentioned arbitration cycle for providing the processor access to the system bus only during the last-mentioned arbitration cycle while said arbitration supervisor responds to the service request to grant access to said second other functional unit at the end of said last-mentioned arbitration cycle.

2. A multi-bus microcomputer system comprising:
a processor and a plurality of other functional units coupled to and sharing control of a system bus;
arbitration means coupled to the system bus and determining during a arbitration time period access to said system bus at the end of said arbitration time period by one of said other functional units in accordance with relative priority levels assigned to each functional unit;
said arbitration means permitting access to said system bus by said processor so long as no other functional unit has requested access to no controls said system bus;
logic means, coupled to said arbitration means and responsive to processor request for access to said system bus while one of said other functional units controls said system bus and at least a second other functional unit has a request for service, for initiating a termination control of said system bus;
said arbitration means being effective upon said termination initiating an arbitration time period for control of said system bus by of said other functional units at the end of said arbitration time period no functional unit having control of the system bus during said arbitration time period; and
permitting means, responsive to said arbitration means, for permitting processor access to said system bus during the last-mentioned arbitration time period and other functional unit access to the system bus at the end said last-mentioned time period.

3. The system of claim 2 further comprising:
program controlled means coupled to said logic means for rendering said logic means alternatively effective or ineffective to respond to a processor request for access to the system bus.

4. A multi-bus microcomputer system comprising;
a processor couple to a processor local bus;
a system bus couple to said processor local bus;
a plurality of functional units which share control of said system bus and which are couple to said system bus;
an arbitration supervisor responsive to a processor signal requesting access to said system bus, while a first one of said functional units has control of said system bus and while second ones of said functional units have pending requests for service, for initiating a termination of said control of the system bus by said first functional unit and for subsequently initiating an arbitration cycle, during which cycle no functional unit has control of the system bus;
said arbitration supervisor effective during said arbitration cycle for concurrently
granting the processor access to said system bus during said arbitration cycle, and
determining relative priority values of said second functional units; and
said arbitration supervisor effective at the end of said arbitration cycle for granting access to the system bus to one of said second functional units in accordance with their priority values.

5. Data processing apparatus comprising
a processor having a local bus;
a system bus and means coupling the system bus to the local bus;

a memory connected to the system bus, said system bus routing processor and input/output data transfers with said memory; and an arbitration supervisor for controlling the use of said system bus;

said arbitration supervisor responsive to a processor signal requesting access to said system bus during a current input/output data transfer while at least one input/output request for access to said system bus is pending for initiating a termination of said current input/output data transfer and for subsequently initiating an arbitration cycle, during which cycle no functional unit has control of the system bus;

said arbitration supervisor effective during said arbitration cycle for concurrently granting the processor access to said system bus during said arbitration cycle for a process or data transfer, and determining relative priorities of pending input/output requests; and said arbitration supervisor effective at the end of said arbitration cycle for granting access to said system bus for an input/output data transfer in accordance with the priorities of the pending input/output requests.

* * * * *